United States Patent
Roy et al.

(10) Patent No.: US 11,915,524 B2
(45) Date of Patent: Feb. 27, 2024

(54) METHOD AND SYSTEM FOR HANDWRITTEN SIGNATURE VERIFICATION

(71) Applicant: Tata Consultancy Services Limited, Mumbai (IN)

(72) Inventors: Dibyendu Roy, Kolkata (IN); Arijit Chowdhury, Kolkata (IN); Arijit Sinharay, Kolkata (IN); Avik Ghose, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 717 days.

(21) Appl. No.: 17/044,299

(22) PCT Filed: Feb. 18, 2019

(86) PCT No.: PCT/IB2019/051285
§ 371 (c)(1),
(2) Date: Sep. 30, 2020

(87) PCT Pub. No.: WO2019/207367
PCT Pub. Date: Oct. 31, 2019

(65) Prior Publication Data
US 2021/0157887 A1 May 27, 2021

(30) Foreign Application Priority Data
Apr. 24, 2018 (IN) .............. 201821015442

(51) Int. Cl.
*G06F 21/31* (2013.01)
*G06F 21/32* (2013.01)
*G06V 40/20* (2022.01)

(52) U.S. Cl.
CPC ............ *G06V 40/28* (2022.01); *G06F 21/316* (2013.01); *G06F 21/32* (2013.01)

(58) Field of Classification Search
CPC .............................. G06F 21/316; G06F 21/32
See application file for complete search history.

(56) References Cited

U.S. PATENT DOCUMENTS

| 2003/0001818 | A1* | 1/2003 | Katagiri ............... | G06V 10/145 345/158 |
| 2006/0291703 | A1* | 12/2006 | Beigi .................... | G07F 7/1066 382/232 |

(Continued)

OTHER PUBLICATIONS

Jakub Segen et al., Shadow Gestures: 3D Hand Pose Estimation using a Single Camera, pp. 479-485, IEEE, 1999 (Year: 1999).*

(Continued)

*Primary Examiner* — Jeffrey D. Popham
(74) *Attorney, Agent, or Firm* — FINNEGAN, HENDERSON, FARABOW, GARRETT & DUNNER, LLP

(57) ABSTRACT

This disclosure relates generally to a method and system for online handwritten signature verification providing a simpler low cost system. The method comprises extracting signature data for the subject from a sensor array for the predefined time window at regular predefined time instants. Further, differentiating the matrix row wise and column wise to generate a row difference matrix and a column difference matrix. Further, determining an idle signature time fraction for the extracted signature data of the subject being monitored from the column difference matrix. Further, determining a plurality of signature parameters based on the row difference matrix and the column difference matrix. Further, analyzing the idle signature time fraction and the plurality of signature parameters of the subject being monitored based on a Support Vector Machine (SVM) classifier, wherein the SVM classifier performs online classification of the extracted signature data into one of a matching signature class and a non-matching signature class.

13 Claims, 6 Drawing Sheets

(56) References Cited

U.S. PATENT DOCUMENTS

| | | |
|---|---|---|
| 2010/0204540 A1 | 8/2010 | Oohashi et al. |
| 2012/0249422 A1* | 10/2012 | Tse ........................ G06F 3/0304 |
| | | 345/158 |
| 2017/0185722 A1 | 6/2017 | Vu et al. |

OTHER PUBLICATIONS

Dibyendu Roy et al., "Novel Handwritten Signature Verification System Based On Shadow Sensing", IEEE, 3 pages, 2017 (Year: 2017).*

International Search Report and Written Opinion dated Aug. 2, 2019, in International Application No. PCT/IB2019/051285; 6 pages.

* cited by examiner

METHOD AND SYSTEM FOR HANDWRITTEN SIGNATURE VERIFICATION

PRIORITY

The present application is a U.S. National Stage Filing under 35 U.S.C. § 371 and claims priority from International Application No. PCT/IB2019/05128 filed on 18 Feb. 2019, which application claims priority under 35 U.S.C. § 119 from India Application no. 201821015442 filed on 24 Apr. 2018. The entire contents of the aforementioned application are incorporated herein by reference.

TECHNICAL FIELD

The disclosure herein generally relates to automatic classification, and, more particularly, to online verification of hand written signature using automatic classification and recognition techniques.

BACKGROUND

Soft biometric is widely utilized in an assortment of security applications, wherein a subject is authenticated based on physiological parameters or behavioral attributes. Typically, in one approach of soft biometrics, verification relies on estimations of biological markers of a subject being monitored, for example, the ECG, brain-waves and so on. In another approach the verification relies on behavioral attributes of the subject, for example, gait, handwritten signatures and the like. With the physiological or behavioral data most biometric systems primarily perform either verification or identification. Handwritten signatures, alternatively referred as signatures, often cater to both scenarios and are widely used in various fields including legal, financial and attestation areas. Primary reason for wide usage of handwritten signatures stems from its unobtrusive nature.

The handwritten signature verification is separated in two classes/modes including online (dynamic) verification and offline (static) verification. In the online mode, a device, (for example, a digitizing table) is utilized to obtain the user's signature in real-time whereas for offline mode, the signature is acquired, digitized and analyzed after the written process is finished. The online verification approach provides timing information about one or more gestures associated with the gesture (hand written signature) being performed by the subject. The timing information provides higher verification performance and also caters for real-time applications like gated security systems. Existing online signature verification system asks the subject to wear gloves with sensors. The data collected from the sensors on the gloves is utilized for distinguishing finger twist, hand position, and coordination for recognizing hand signatures. Moreover, more sophisticated signature verification framework utilizing Hidden Markov Model (HMM) is also used by existing methods. In addition to this, a strategy for confirming handwritten signatures where different static elements such as stature, incline, and so on and dynamic elements such as speed, pen, tip pressure, and so on, are extracted and used to train several network topologies. In another existing method, a tablet computer is utilized for acquiring data with three different classification schemes to recognize signatures. Finally, a Discrete Wavelet transform (DWT) technique is utilized for extracting features from handwritten signatures to achieve higher verification rate than time domain verification approach used by other existing methods. Majority of the existing approaches use sophisticated hardware along with complex algorithms such as HMM, DWT and the like that makes the hand verification systems costly, effectively reducing usability.

Another existing system performs gesture detection and recognition using ambient light using a diode array along with classification techniques. However, the gestures here are limited to only specific hand gestures and do not refer to signature gesture. The signature gesture detection is a challenge as to accurately identify the signature gesture. The smoothness and ease of performing the gesture along with style of performing the gesture is a major factor, to be considered.

SUMMARY

Embodiments of the present disclosure present technological improvements as solutions to one or more of the above-mentioned technical problems recognized by the inventors in conventional systems.

For example, in one embodiment, a processor implemented method for handwritten signature verification is provided. The method comprises monitoring hand movement associated with a handwritten signature gesture of a subject for a predefined time window based on shadow sensing mechanism comprising a sensor array and ambient light. Further, extracting signature data for the subject from the sensor array for the predefined time window at regular predefined time instants. The extracted signature data for the subject is represented as a matrix with each row of the matrix representing signature data corresponding to each time instant and each column representing status of each sensor from the sensor array for corresponding time instant. Further, pre-processing the extracted signature data by differentiating the matrix row wise and column wise to generate a row difference matrix and a column difference matrix. Furthermore, determining an idle signature time fraction for the extracted signature data of the subject being monitored from the column difference matrix and determining a plurality of signature parameters based on the column difference matrix and the row difference matrix. The plurality of signature parameters comprise a temporal variability for each sensor derived from the column difference matrix, a positional variability for each sensor derived from the row difference matrix and a distance value of a distance parameter derived for each sensor that maximizes an optimization function. The optimization function is defined by the distance parameter, a penalty term, a matching signature covariance matrix, a nonmatching signature covariance matrix and a constant value. Furthermore, the method comprises analyzing the idle signature time fraction and the plurality of signature parameters of the subject being monitored based on a Support Vector Machine (SVM) classifier. The SVM classifier performs online classification of the extracted signature data into one of a matching signature class and a non-matching signature class with respect to a subject of interest.

In another aspect, a system for handwritten signature verification is provided. The system comprises a shadow sensing unit comprising a sensor array with a plurality of sensors, an ambient light source and a data acquisition unit and a signature verification system. The shadow sensing unit, providing a shadow sensing mechanism, is configured to monitoring hand movement associated with a handwritten signature gesture of a subject for a predefined time window based on shadow sensing mechanism comprising a sensor array and ambient light. Further, the signature verification system is configured to extracting signature data for the subject from the sensor array for the predefined time window at regular predefined time instants. The extracted signature data for the subject is represented as a matrix with each row of the matrix representing signature data corresponding to each time instant and each column representing status of each sensor from the sensor array for corresponding time instant. Further, pre-process the extracted signature data by differentiating the matrix row wise and column wise to generate a row difference matrix and a column difference matrix. Furthermore, determine an idle signature time fraction for the extracted signature data of the subject being monitored from the column difference matrix and determine a plurality of signature parameters based on the column difference matrix and the row difference matrix. The plurality of signature parameters comprise a temporal variability for each sensor derived from the column difference matrix, a positional variability for each sensor derived from the row difference matrix and a distance value of a distance parameter derived for each sensor that maximizes an optimization function. The optimization function is defined by the distance parameter, a penalty term, a matching signature covariance matrix, a nonmatching signature covariance matrix and a constant value. Furthermore, the signature verification system is configured to analyze the idle signature time fraction and the plurality of signature parameters of the subject being monitored based on a Support Vector Machine (SVM) classifier. The SVM classifier performs online classification of the extracted signature data into one of a matching signature class and a non-matching signature class with respect to a subject of interest.

In yet another aspect, a non-transitory computer readable medium for handwritten signature verification is provided. The non-transitory computer-readable medium stores instructions which, when executed by a hardware processor, cause the hardware processor to perform actions comprising monitoring hand movement associated with a handwritten signature gesture of a subject for a predefined time window based on shadow sensing mechanism comprising a sensor array and ambient light. Further, extracting signature data for the subject from the sensor array for the predefined time window at regular predefined time instants. The extracted signature data for the subject is represented as a matrix with each row of the matrix representing signature data corresponding to each time instant and each column representing status of each sensor from the sensor array for corresponding time instant. Further, pre-processing the extracted signature data by differentiating the matrix row wise and column wise to generate a row difference matrix and a column difference matrix. Furthermore, determining an idle signature time fraction for the extracted signature data of the subject being monitored from the column difference matrix and determining a plurality of signature parameters based on the column difference matrix and the row difference matrix. The plurality of signature parameters comprise a temporal variability for each sensor derived from the column difference matrix, a positional variability for each sensor derived from the row difference matrix and a distance value of a distance parameter derived for each sensor that maximizes an optimization function. The optimization function is defined by the distance parameter, a penalty term, a matching signature covariance matrix, a nonmatching signature covariance matrix and a constant value. Furthermore, the actions comprise analyzing the idle signature time fraction and the plurality of signature parameters of the subject being monitored based on a Support Vector Machine (SVM) classifier. The SVM classifier performs online classification of the extracted signature data into one of a matching signature class and a non-matching signature class with respect to a subject of interest.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1A:
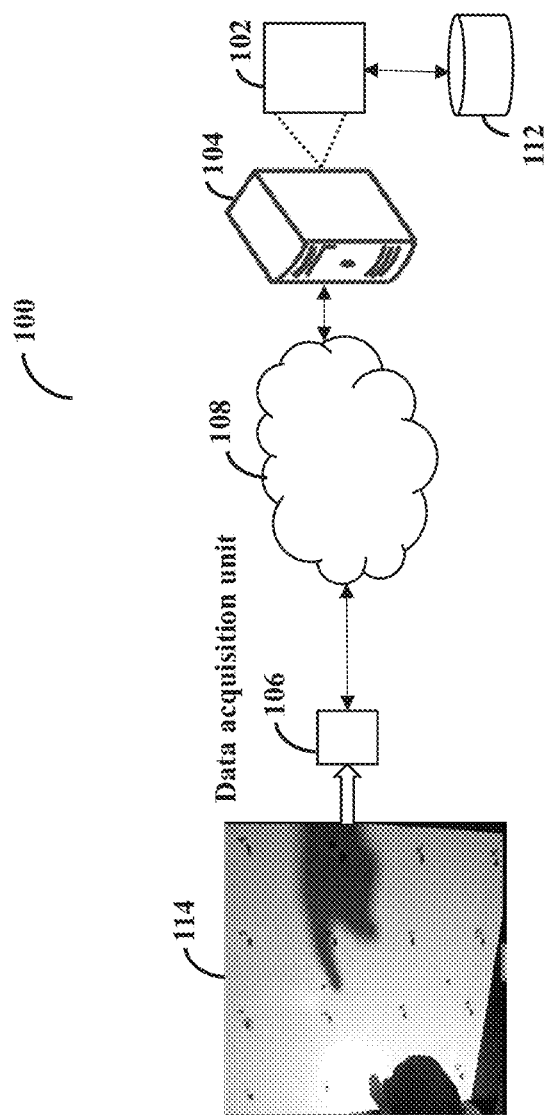
FIG. 1a illustrates an exemplary system implementing a signature verification system for online detection of handwritten signatures, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for handwritten signature verification. The proposed method and the system, enables real time, online signature verification using a low cost simple solution. The system utilizes a sensor array such as a low cost diode array to capture signature data of a subject being monitored based on shadow sensing. The shadow sensing relies only on ambient light as a light source. Signature data acquired form the sensor array is processed and analyzed using proposed Common Spatial Pattern (CSP) filtering adapted for handwritten signature verification in combination with Support Vector Machine (SVM) classifier. The CSP-SVM combination provides enhanced accuracy.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1a illustrates an exemplary system 100 implementing a signature verification system 102 for online detection of handwritten signatures, according to some embodiments of the present disclosure.

Figure 1B:
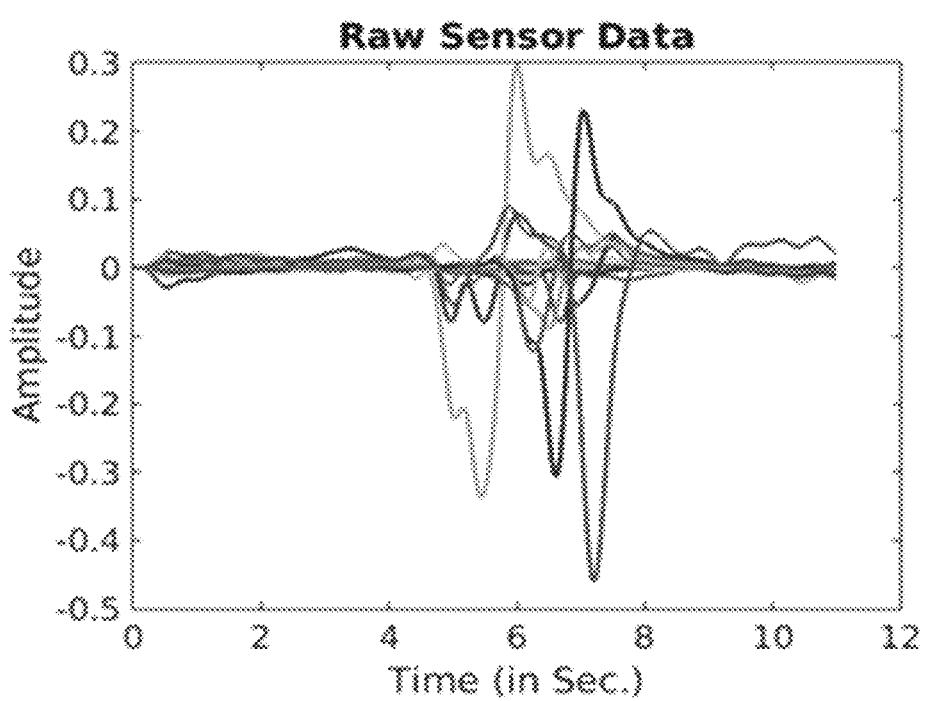
FIG. 1b illustrates a graphical signal representation of raw sensor data acquired by a data acquisition unit of the exemplary system, according to some embodiments of the present disclosure.
Figure 2:
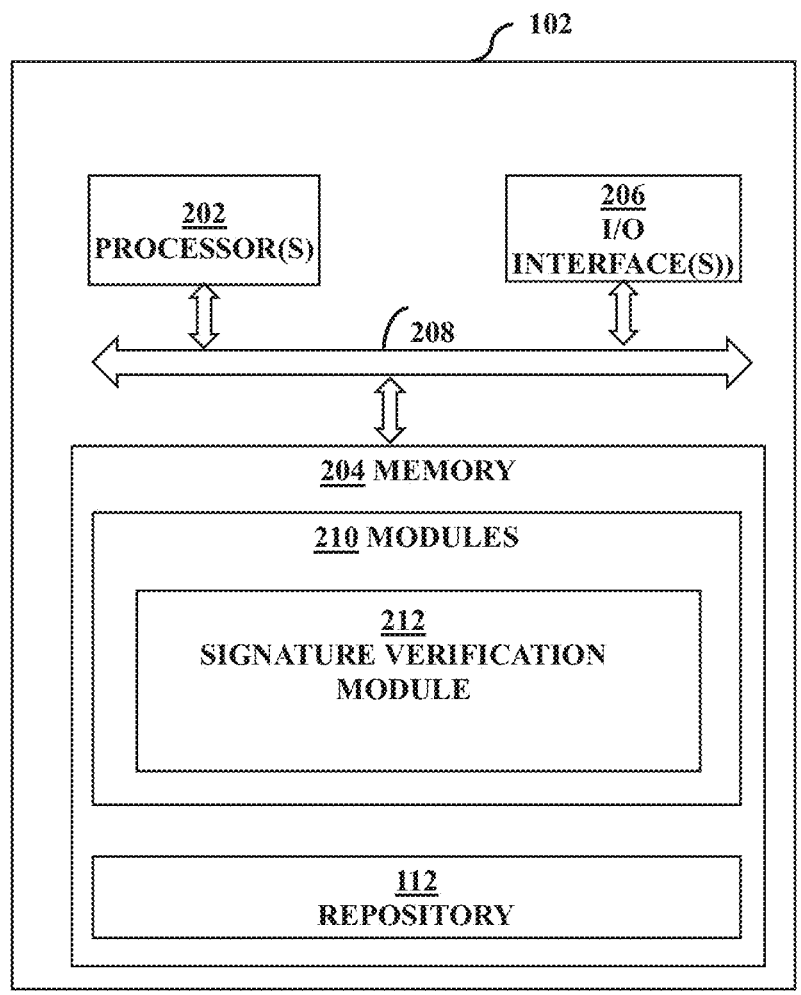
FIG. 2 is a functional block diagram of the signature verification system of FIG. 1, according to some embodiments of the present disclosure.

The system 100 depicts data source 106, alternatively referred as data acquisition unit 106. The data acquisition unit 106 is a unit of a shadow sensing unit that includes a sensor array 114 and ambient light as a light source for providing shadow sensing mechanism. The data acquisition unit 106 is source of the signature data acquired for one or more subjects being monitored by the signature verification system 102, implemented in a computing device 104. The signature verification system 102 may be externally coupled (as shown in FIG. 1) to the computing device 104 or may be internal (not shown) to the computing device 104. The signature data acquired through the data acquisition unit 106 can be stored in the repository 112. The repository 112 may be external to the signature verification system 102 or internal to the signature verification system 102 (as shown in FIG. 2). The repository 112, coupled to the signature verification system 102 may also store other data such as the intermediate data generated during signature verification process. In an embodiment, the data acquisition unit 106 may be directly connected to the signature verification system 102. In an embodiment, a plurality of data acquisition units 106 may be connected to the signature verification system 102 for signature verification at multiple sites for corresponding identified subject providing authentication mechanism at those sites. The signature verification system 102, then can be trained for all the multiple scenarios for the corresponding subject.

In an embodiment, a network 108, transmitting data streams from the data acquisition unit 106 the computing device 104, may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the signature verification system 102 through communication links. In an embodiment, the computing device 104, which implements the signature verification system 102 can be a workstation, a mainframe computer, a general purpose server, a network server or the like.

The system 100 utilizes the sensor array 114 comprising a plurality of sensors. For example, an economical and easily available diode array capable of sensing shadow cast by hand movement associated with a handwritten signature gesture of a subject, may be used. The shadow, referred herein, correspond to shadow of hand or finger movement cast on the sensor array 114 in presence of ambient light. Thus, the system 100 does not require any dedicated or special light source, effectively providing a cost efficient system.

Signature data is extracted from signals (raw data) acquired from the sensor array 114 through the data acquisition unit 106, wherein the signature verification system 102 represents the signature data in form of a matrix. A raw sensor data acquired from the sensor array 114 (typically a 4×4 diode array) and provided to the signature verification system 102 through the data acquisition unit 106 is illustrated in FIG. 1b. The signature data in matrix form is pre-processed to generate a column difference matrix and a row difference matrix. Further, from the column difference matrix an idle signature time fraction is determined. Further, using the column difference matrix and the row difference matrix a plurality of signature parameters are determined. The signature verification system 102 utilizes machine learning techniques comprising the CSP filtering in combination with the SVM classifier for signature verification. The CSP-SVM combination, currently used primarily in medical domain signal analysis and classification is adapted herein for handwritten signal verification process. The plurality of extracted signal parameters correspond to the CSP component adapted for real time, online signature data. This adaptation of CSP-SVM technique, as proposed for soft bio-metrics such as signature verification enhances accuracy of signature verification process, as the real time signature data is a challenge to analyze. Moreover, with the proposed system 100, the subject performing the gesture of hand written signature is not required to use any dedicated device, rather can perform the gesture for authentication using subject's finger movement. This makes the proposed system easily adaptable and usable at most scenarios. The signature verification system 102 implements the handwritten signature verification mechanism in two phases. One is a training phase where the signature verification system 102 is trained using training data associated with handwritten signatures of subject (s) of interest using machine learning techniques comprising CSP+SVM. Other is a testing phase wherein the all unknown subjects are verified or authenticated by correctly classifying the subjects being monitored into matching signature class for the handwritten signature gesture performed by the subject of interest and a non-matching signature class for all subjects other than the subject of interest. The testing phase also utilizes CSP+SVM. The components or modules and functionalities of the signature verification system 102 are described further in detail in conjunction with FIG. 2.

FIG. 2 is a functional block diagram of the signature verification system 102 of FIG. 1, according to some embodiments of the present disclosure. The signature verification system 102 includes or is otherwise in communication with one or more hardware processors such as a processor(s) 202, at least one memory such as a memory 204, and an I/O interface 206. The processor 202 (hardware processor), the memory 204, and the I/O interface(s) 206 may be coupled by a system bus such as a system bus 208 or a similar mechanism. The memory 204 further may include modules 210.

In an embodiment, the modules 210 include a signature verification module 212 and other modules (not shown) for implementing functions of the signature verification system 102. In an embodiment, the modules 210 can be an Integrated Circuit (IC), external to the memory 204 (not shown), implemented using a Field-Programmable Gate Array (FPGA) or an Application-Specific Integrated Circuit (ASIC). The names of the modules of functional block within the modules 210 referred herein, are used for explanation and are not a limitation. Further, the memory 204 can also include the repository 112 (internal to the signature verification system 102 as shown in FIG. 2).

In an embodiment, the signature verification module 212 can be configured to receive data from the data acquisition unit 106. The shadow sensing unit comprising the data acquisition unit 106 and the sensor array 114 monitors hand movement associated with the handwritten signature gesture of the subject for a predefined time window. The hand movement, or typically the finger movement is captured using the shadow sensing mechanism. The shadow cast by the hand movement of the subject is captured using the sensor array 114 comprising the plurality of sensors. Further, the signature verification module 212 can be configured to extract the signature data for the subject being monitored, wherein the signature data is extracted from data received from the data acquisition unit 106 and the sensor array 114 (that provide the shadow sensing mechanism) for the predefined time window at regular predefined time instants. The extracted signature data for the subject is represented as a matrix with each row of the matrix representing signature data corresponding to each time instant and each column representing status of each sensor from the sensor array 114 for corresponding time instant.

An example herein uses a 16 dimensional signal generated from a 4×4 sensor array for duration N (N varies for each user or subject). Thus obtained signature data can be represented as the matrix (W), of dimension 16×N. Thus W can be represented as W=[C1, C2, ..., CN] column wise representation and
W=[R1, ... R16] row wise representation Once the matrix is obtained, the signature verification module 212 can be configured to pre-process the extracted signature data by differentiating the matrix row wise and column wise to generate a row difference matrix and a column difference matrix. For the example considered, The column difference matrix is as in equation 1 below:

$$W1^* = [C^*1, C^*2, \ldots, C^*(N-1)] \text{ where, } C^*i = C(i+1) - Ci \quad (1)$$

The row difference matrix is as in equation 2 below $$W2^* = [R^*1, R^*2, \ldots R^*16] \text{ where, } R^*i = R(i^*)/K - Ri \quad (2)$$

and K is the number of neighbours of the ith sensor.

$$R(i^*) = \text{sum}(Rj) \text{ such hat } Rj \text{ is a neighbor of } Ri - \quad (3)$$

Once the row difference matrix and the column difference matric are generated, the signature verification module 212 is configured to determine an idle signature time fraction for the extracted signature data of the subject being monitored, using the column difference matrix. Thus, for the matrix W in the example considered, from the column difference matrix W1* a sliding window of duration, for example 50 ms, is used to identify the portion of data which shows no variation that correspond to number of columns of the W1* in which sensors show no significant variation. The, human gesture information normally varies with 200 ms duration, hence the sliding window sufficiently less than 200 ms, such as 50 ms can be chosen.

Further, from this data, the idle signature time fraction is computed, wherein, as provided in equation 4 below:

idle signature time fraction=no of columns of the column difference matrix with non-significant variations/total no of columns of the column difference matrix (N−1) (4)

Further, the signature verification module 212 is configured to determine a plurality of signature parameters based on the row difference matrix and the column difference matrix. The plurality of signature parameters comprise a temporal variability ($t_v$), a positional variability ($p_v$), and a distance parameter d, The temporal variability for each sensor, as provided in equation 5, is derived from the column difference matrix. The positional variability for each sensor, as provided in equation 6, is derived from the row difference matrix. The distance value of the distance parameter for each sensor is derived by solving an optimization function as provided in equation 7, wherein value of d that optimizes the equation 7 is identified. Thus, for each $i^{th}$ sensor value of distance parameter (d) is (di) and computed using equation 7.

Let, the column difference matrix, W1*=[aij] and row difference matrix, W2*=[bij], then $$\text{temporal\_variability} = \frac{\sum_j a_{ij}^2}{\sum_j \sum_i a_{ij}^2} \quad (5)$$

$$\text{positional\_variability} = \frac{\sum_j b_{ij}^2}{\sum_j \sum_i b_{ij}^2} \quad (6)$$

$$\text{optimize} \frac{dCl_2 d^t}{dCl_1 d^t + k^* P(d)} \quad (7)$$

The optimization function of the equation 7 is defined by the distance parameter, a penalty term P (d), a matching signature covariance matrix, a nonmatching signature covariance matrix and a constant value. The penalty term P (d) is derived from the temporal variability and the positional variability of equation 5 and 6 respectively. The constant value (k) is obtained from ratio of determinant of the matching signature covariance matrix $Cl_2$ (class 2) and determinant of the nonmatching signature covariance matrix $Cl_1$ (Class 1), as provided in equation 9 below. The matrices, $Cl_2$ and $Cl_1$ are covariance matrices of class 2 (the correct signature) and class1 (rest of signature) respectively.

Thus, the penalty term P (d) is defined as summation of product of value of a sensor importance parameter (m) determined for each sensor and square of value of the distance parameter (di) determined for each of the $i^{th}$ sensor to summation of the value of the sensor importance parameter determined for each sensor. The P (d) is represented by equation 8.

$$P(d) = \text{sum}(mi di^2)/\text{sum}(mi) \quad (8)$$

$$\text{value of } k \text{ is taken to be } 0.8^* \det(Cl_2)/\det(Cl_1) \quad (9)$$

In case det(Cli)=0, then it is replaced by product of all its nonzero eigenvector.

The parameter mi, which the sensor importance parameter (m) for $i^{th}$ sensor, the value of mi is derived based on the temporal variability and the positional variability.as provided below, in table 1. Here, #0.6 and 0.3 can be configured based on need and M=square root of number of sensor.

TABLE 1

| temporal_variability (tv) | Positional_variability (pv) | $m_i$ |
|---|---|---|
| >0.6/M | >0.6/M | 0 |
| <=0.6/M & >0.3/M | >0.6/M | tv |
| >0.6/M | <=0.6/M & >0.3/M | pv |
| <=0.6/M & >0.3/M | <=0.6/M & >0.3/M | Sqrt(tv * pv) |
| <=0.3/M | <=0.3/M | 5 |

Once the idle time fraction and the plurality of signature parameters are computed, the signature verification module 212 is configured to analyse, online, the idle signature time fraction and the plurality of signature parameters of the subject being monitored based on the SVM classifier. The SVM classifier performs online classification of the extracted signature data into one of the matching signature class and the non-matching signature class with respect to the subject of interest. The SVM is provided with the plurality of parameters as inputs such as the d, $t_v$, $p_v$, to try and draw a hyper plane between the differently labeled data-sets (class1 and class 2). When the idle fraction is provided as part of the input, it acts as one of the dimensions which helps the SVM kernel to draw the hyperplane. Thus, the idle time fraction serves as discriminative features which enables good separation between the data from different labels, herein class1 and class 2.

Further, the hardware processor(s) 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the modules 210, internal or external to the memory 204, for triggering execution of functions to be implemented by the modules 210.

The I/O interface(s) 206 in the signature verification system 102 may include a variety of software and hardware interfaces, for example, a web interface, a graphical user interface and the like. The interface(s) 206 may include a variety of software and hardware interfaces, for example, interfaces for peripheral device(s), such as a keyboard, a mouse, an external memory, sensors (data sources 106-1 through 106-n), and a printer and a display. The interface(s) 206 may enable the signature verification system 102 to communicate with other devices, such as the computing device 104, web servers and external databases (such as the repository 112, if external to the signature verification system 102). The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting a number of computing systems with one another or to another server computer. The I/O interface(s) 206 may include one or more ports for connecting a number of devices to one another or to another server. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 may include computer-readable instructions that supplement applications or functions performed by the signature verification system 102. The repository 112 may store data that is processed, received, or generated as a result of the execution of one or more modules in the module(s) 210.

Figure 3:
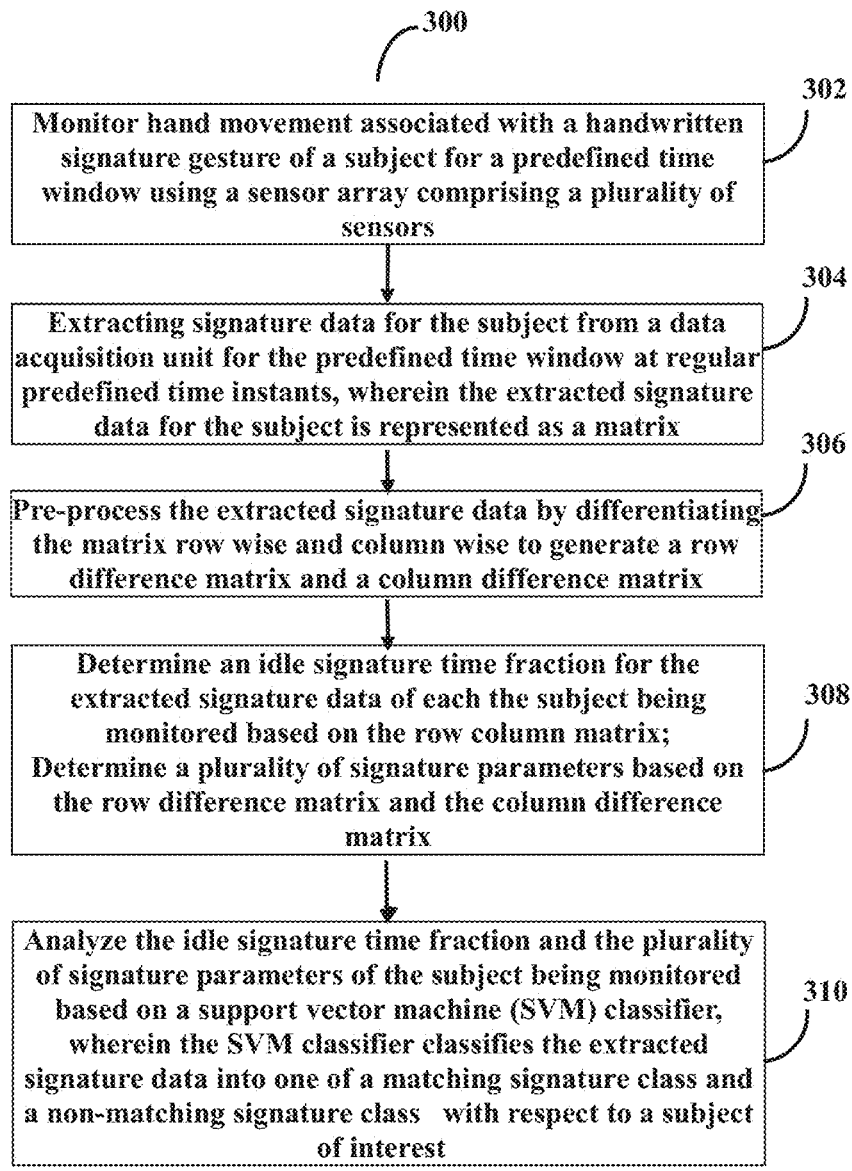
FIG. 3 is a flow diagram illustrating a method for handwritten signature verification for online detection of the handwritten signatures, according to some embodiments of the present disclosure.

FIG. 3 is a flow diagram illustrating a method 300 for handwritten signature verification for online detection of the handwritten signatures, in according to some embodiments of the present disclosure. In an embodiment, at step 302, the method 300 includes allowing the shadow sensing unit comprising the sensor array 114 and the data acquisition unit 106, which provide the shadow sensing mechanism by using ambient light as the light source, to monitor hand movement associated with the handwritten signature gesture of the subject for a predefined time window. The hand movement, or typically the finger movement is captured based on shadow sensing, wherein shadow cast by the hand movement of the subject is captured using the sensor array 114 comprising the plurality of sensors.

At step 304, the method 300 includes allowing the signal verification system 102 to extract the signature data for the subject from the data acquisition system 106 for the predefined time window at regular predefined time instants. The extracted signature data for the subject is represented as the matrix W as in FIG. 2 with each row of the matrix representing signature data corresponding to each time instant and each column representing status of each sensor from the sensor array 114 for corresponding time instant. At step 306, the method 300 includes allowing the signal verification system 102 to pre-process the extracted signature data by differentiating the matrix row wise and column wise to generate the row difference W2* matrix and the column difference matrix W1* as in equation 1 and 2 in FIG. 2. At step 308, the method includes allowing the signal verification system 102 to determine the idle signature time fraction for the extracted signature data of the subject being monitored using the column difference matrix. At step 308, the method 300 also includes allowing the signal verification system 102 to also determine the plurality of signature parameters based on the row difference matrix and the column difference matrix. The plurality of signature parameters comprise the temporal variability for each sensor as provided in equation 5 derived from the column difference matrix, the positional variability for each sensor as provided in equation 6 derived from the row difference matrix and the distance value of the distance parameter that optimizes the optimization function provided in equation 7. The optimization function of the equation 7 is defined by the distance parameter, the penalty term P (d) as provided in equation 8 derived from the sensor importance parameter (m) and the distance parameter (d). The value of m for each sensor is derived from temporal variability and the positional variability as explained in conjunction to table 1. Further, the optimization function is also defined by parameters including the matching signature covariance matrix, the nonmatching signature covariance matrix and a constant value derived based on determinant of the matching signature covariance matrix $Cl_2$ (class 2) and determinant of the nonmatching signature covariance matrix $Cl_1$ (Class 1). Thus, $Cl_2$ and $Cl_1$ are covariance matrix of class 2 (the correct signature) and class1 (rest of signature). The covariance matric can be computed using techniques know in the art, and not elaborated for brevity. Thus, the penalty term P (d) is defined as summation of product of value of the sensor importance parameter (m) determined for each sensor and square of the distance measure (di) determined for each sensor to summation of the value of the sensor importance parameter determined for each sensor and represented by equation 8. At step 310, the method 300 includes allowing the signature verification system 102 to analyse the idle signature time fraction and the plurality of signature parameters of the subject being monitored based on the SVM classifier. Thus, the SVM classifier performs online classification of the extracted signature data the matching signature class or the non-matching signature class, with respect to the subject of interest.

Figure 4:
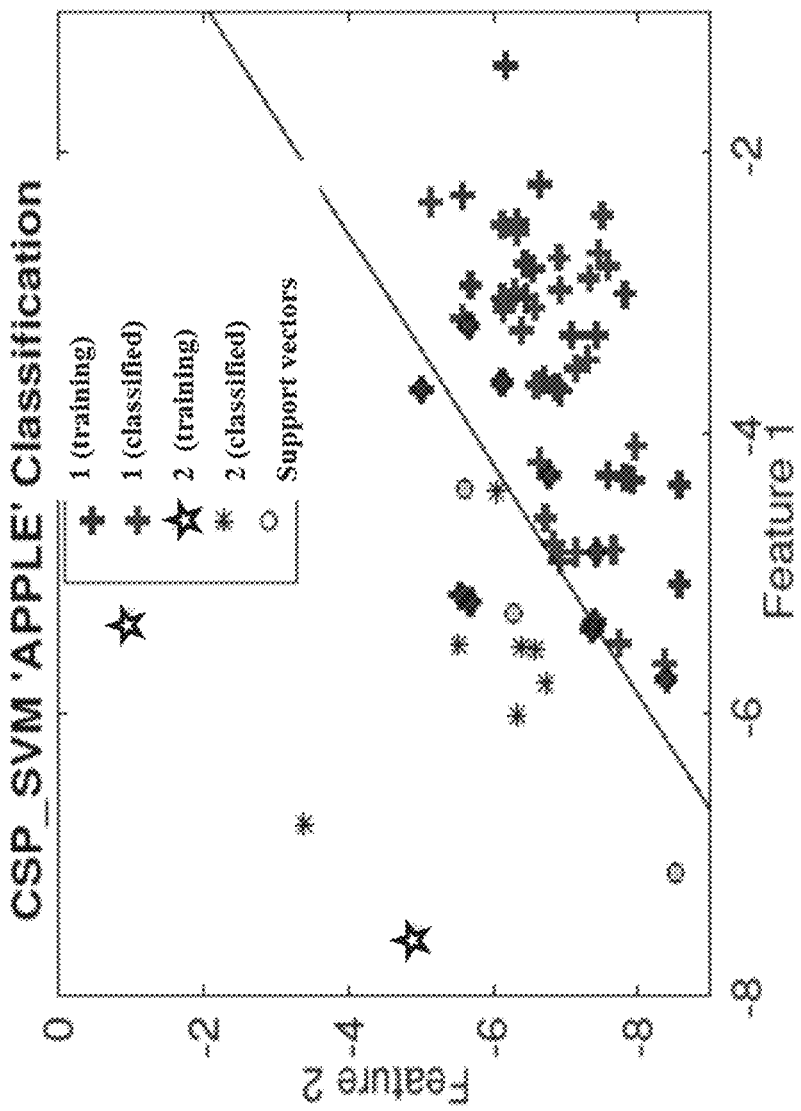
FIG. 4 is a graphical representation of classification carried out by the system for an example handwritten signature gesture, according to some embodiments of the present disclosure.

FIG. 4 is a graphical representation of classification carried out by system for an example handwritten signature gesture, according to some embodiments of the present disclosure. The FIG. 4 represents the results of SVM classification using CSP for authentication for one subject. Data of other class (non-matching class) are shown in cross and true class (matching class) in star. Classification works on test data all together and gives higher classification accuracy. For authentication problem, sensitivity and specificity obtained for different subject is summarized in Table 2. For subject 1 versus all other subjects, the classification accuracy obtained is around 97%. For subject 4 versus all, the subjects, the system has highest classification accuracy (100%) and for subject 9 vs. all, it has lowest classification accuracy (91%). Thus, the signature verification system 102 is able to identify a person (subject) correctly in presence of relatively large number of incorrect signature.

TABLE 2

|   | S1 | S2 | S3 | S4 | S5 | S6 | S7 | S8 | S9 | S10 |
|---|---|---|---|---|---|---|---|---|---|---|
| Sensitivity | 0.95 | 0.97 | 1 | 0.96 | 1 | 0.94 | 0.92 | 0.95 | 0.99 | 0.94 |
| Specificity | 0.97 | 1 | 1 | 1 | 0.96 | 0.92 | 0.99 | 0.93 | 0.91 | 0.92 |

Figure 5:
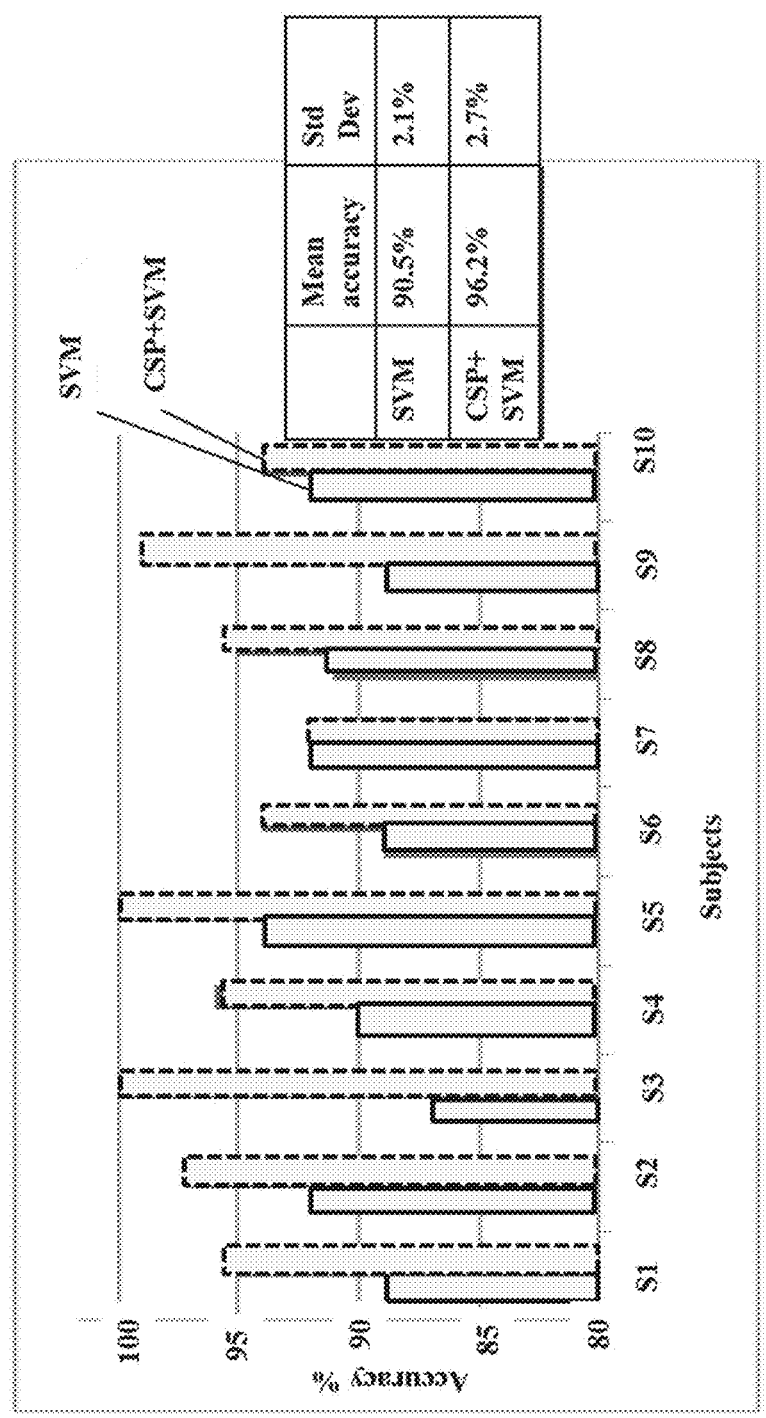
FIG. 5 illustrates comparative analysis of accuracy of classification of the handwritten signatures using only Support Vector Machine (SVM) classifier based classification and the proposed Common Spatial Pattern (CSP)-SVM classification, according to some embodiments of the present disclosure.

FIG. 5 illustrates comparative analysis of accuracy of classification of the handwritten signatures using only the SVM classifier based classification and the proposed CSP-SVM classification, according to some embodiments of the present disclosure. To classify the writing pattern (representing handwritten signature) of different subjects when a password (capitalized form of "APPLE") gesture is performed in front of the sensor array 114. Experiment is conducted on 10 subjects and for each subject a classifier (corresponding to that subject) is used to authenticate him/her. Thus, the case is one vs. all classification. Initially SVM is used on basic features (mean, variance of raw signals). This provides good accuracy (87%-94%). However, with application of the proposed CSP+SVM, the CSP addition further improved accuracy. The graph indicates that for the CSP combined with SVM accuracy of classification or verification increases. Moreover, accuracy is high for all subjects under consideration and not much variation is seen from subject to subject. For all subject the data of other class or the non-matching class (in each classification) is more in number than true class or the matching class.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps of method 300 are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for handwritten signature verification, wherein the method comprises:
    monitoring, by a hardware processor, hand movement associated with a handwritten signature gesture of a subject for a predefined time window, based on a shadow sensing mechanism utilizing a sensor array and ambient light;
    extracting by the hardware processor, a signature data for the subject from the sensor array for the predefined time window, at regular predefined time instants, wherein the extracted signature data for the subject is represented as a matrix with each row of the matrix representing signature data corresponding to each time instant and each column representing status of each sensor from the sensor array for corresponding time instant;
    pre-processing by the hardware processor, the extracted signature data by differentiating the matrix, row-wise and column-wise, to generate a row difference matrix and a column difference matrix;
    determining by the hardware processor:
        an idle signature time fraction for the extracted signature data of the subject being monitored from the column difference matrix; and
        a plurality of signature parameters based on the column difference matrix and the row difference matrix, wherein the plurality of signature parameters comprise for each sensor, a temporal variability derived from the column difference matrix, a positional variability derived from the row difference matrix, and a distance value of a distance parameter that maximizes an optimization function, wherein the optimization function is defined by the distance parameter, a penalty term, a matching signature covariance matrix, a nonmatching signature covariance matrix, and a constant value; and
    analysing by the hardware processor, the idle signature time fraction and the plurality of signature parameters of the subject being monitored, based on a Support Vector Machine (SVM) classifier, wherein the SVM classifier performs online classification of the extracted signature data into one of a matching signature class and a non-matching signature class with respect to a subject of interest.

2. The method of claim 1, wherein the row difference matrix is generated by subtracting a previous row of the matrix from a current row and the column difference matrix is generated by subtracting a previous column of the matrix from a current column of the matrix.

3. The method of claim 1, wherein the SVM classifier is trained for the handwritten signature verification of the subject of interest, wherein during training, the extracted signature data for all signatures variations of the subject of interest are labelled as true and the extracted signature data from a plurality of subjects other than the subject of interest are labelled as false.

4. The method of claim 1, wherein the penalty term of the optimization function is a ratio of, summation of product of value of a sensor importance parameter determined for each sensor and square of the distance parameter determined for each sensor to summation of the value of the sensor importance parameter determined for each sensor, wherein value of the sensor importance parameter for each sensor is derived based on the temporal variability and the positional variability.

5. The method of claim 1, wherein the constant value of the optimization function is based on determinant of the matching signature covariance matrix and determinant of the nonmatching signature covariance matrix.

6. The method of claim 1, wherein determining the idle signature time fraction from the column matrix, for the extracted signature data of the subject being monitored, comprises:
    identifying number of columns of the column difference matrix having variation below a predefined threshold using a sliding window of pre-set time duration; and
    determining the idle signature time fraction by computing ratio of number of columns of the column difference matrix showing non-significant variations to total number of columns.

7. A system for handwritten signature verification, wherein the system comprises:
    a shadow sensing unit comprising a sensor array with a plurality of sensors, an ambient light source and a data acquisition unit; and
    a signature verification system;
    wherein the shadow sensing unit, providing a shadow sensing mechanism, is configured to:
    monitor hand movement associated with a handwritten signature gesture of a subject for a predefined time window;
    the signature verification system is configured to:
    extract signature data for the subject from the shadow sensing mechanism for the predefined time window at regular predefined time instants, wherein the extracted signature data for the subject is represented as a matrix with each row of the matrix representing signature data corresponding to each time instant and each column representing status of each sensor from the sensor array for corresponding time instant;
    pre-processing the extracted signature data by differentiating the matrix row wise and column wise to generate a row difference matrix and a column difference matrix;
    determine:
        an idle signature time fraction for the extracted signature data of the subject being monitored from the column difference matrix; and
        a plurality of signature parameters based on the column difference matrix and the row difference matrix, wherein the plurality of signature parameters comprise a temporal variability for each sensor derived from the column difference matrix, a positional variability for each sensor derived from the row difference matrix and a distance value of a distance parameter derived for each sensor that maximizes an optimization function, wherein the optimization function is defined by the distance parameter, a penalty term, a matching signature covariance matrix, a nonmatching signature covariance matrix and a constant value; and analyze the idle signature time fraction and the plurality of signature parameters of the subject being monitored based on a Support Vector Machine (SVM) classifier, wherein the SVM classifier performs online classification of the extracted signature data into one of a matching signature class and a non-matching signature class with respect to a subject of interest.

8. The system of in claim 7, wherein the signature verification system is configured to generate the row difference matrix by subtracting a previous row of the matrix from a current row and generate the column difference matrix by subtracting a previous column of the matrix from a current column of the matrix.

9. The system of claim 7, the signature verification system is configured to train the SVM classifier for the handwritten signature verification of the subject of interest, wherein during training, the extracted signature data for all signatures variations of the subject of interest are labelled as true and the extracted signature data from a plurality of subjects other than the subject of interest are labelled as false.

10. The system of claim 7, wherein the penalty term of the optimization function is a ratio of, summation of product of value of a sensor importance parameter determined for each sensor and square of the distance parameter determined for each sensor to summation of the value of the sensor importance parameter determined for each sensor, wherein value of the sensor importance parameter for each sensor is derived based on the temporal variability and the positional variability.

11. The system of claim 7, wherein the constant value of the optimization function is based on determinant of the matching signature covariance matrix and determinant of the nonmatching signature covariance matrix.

12. The system of claim 7, wherein the signature verification system is configured to determine the idle signature time fraction from the column matrix, for the extracted signature data of the subject being monitored, by:

identifying number of columns of the column difference matrix having variation below a predefined threshold using a sliding window of pre-set time duration; and determining the idle signature time fraction by computing ratio of number of columns of the column difference matrix showing non-significant variations to total number of columns.

13. A non-transitory computer readable medium for handwritten signature verification, the non-transitory computer-readable medium stores instructions which, when executed by a hardware processor, cause the hardware processor to perform actions comprising:

monitoring hand movement associated with a handwritten signature gesture of a subject for a predefined time window, based on a shadow sensing mechanism utilizing a sensor array and ambient light;

extracting a signature data for the subject from the sensor array for the predefined time window, at regular predefined time instants, wherein the extracted signature data for the subject is represented as a matrix with each row of the matrix representing signature data corresponding to each time instant and each column representing status of each sensor from the sensor array for corresponding time instant;

pre-processing the extracted signature data by differentiating the matrix, row-wise and column-wise, to generate a row difference matrix and a column difference matrix;

determining:

an idle signature time fraction for the extracted signature data of the subject being monitored from the column difference matrix; and a plurality of signature parameters based on the column difference matrix and the row difference matrix, wherein the plurality of signature parameters comprise for each sensor, a temporal variability derived from the column difference matrix, a positional variability derived from the row difference matrix, and a distance value of a distance parameter that maximizes an optimization function, wherein the optimization function is defined by the distance parameter, a penalty term, a matching signature covariance matrix, a nonmatching signature covariance matrix, and a constant value; and analysing the idle signature time fraction and the plurality of signature parameters of the subject being monitored, based on a Support Vector Machine (SVM) classifier, wherein the SVM classifier performs online classification of the extracted signature data into one of a matching signature class and a non-matching signature class with respect to a subject of interest.

* * * * *